(12) United States Patent
Louis

(10) Patent No.: US 8,464,642 B2
(45) Date of Patent: Jun. 18, 2013

(54) SELF-ORIENTING, TWO-WHEEL PIPE CRAWLER

(75) Inventor: James Louis, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 13/217,327

(22) Filed: Aug. 25, 2011

(65) Prior Publication Data

US 2011/0303116 A1 Dec. 15, 2011

Related U.S. Application Data

(63) Continuation-in-part of application No. 12/569,995, filed on Sep. 30, 2009.

(51) Int. Cl.
*B61B 13/00* (2006.01)
(52) U.S. Cl.
USPC ........................................... 104/138.2
(58) Field of Classification Search
USPC . 104/138.1, 138.2; 73/865.8, 623; 356/241.1, 356/241.4, 241.6; 15/104.05; 378/60; 382/141; 396/19; 324/220; 254/134.5; 376/249; 318/568.12
See application file for complete search history.

(56) References Cited

U.S. PATENT DOCUMENTS

| 3,064,127 | A  | * | 11/1962 | Green et al. ...................... 378/59 |
| 6,123,027 | A  | * | 9/2000 | Suyama et al. ............ 104/138.2 |
| 7,343,863 | B2 |   | 3/2008 | Louis |
| 2011/0073001 | A1 |   | 3/2011 | Louis |

* cited by examiner

*Primary Examiner* — Mark Le
(74) *Attorney, Agent, or Firm* — Pauley Petersen & Erickson

(57) ABSTRACT

An apparatus for conveying a payload through a pipe having the ability to automatically self-stabilize and orient itself inside the pipe by controlling two pipe tracking contactors so as to maintain contact between the pipe tracking contactors and the pipe wall and maintain the apparatus in a functional orientation. The apparatus includes tilt sensor arrays for continuously monitoring the position of the apparatus with respect to the pipe wall, variable speed drive motors operably connected with the pipe contactors for rotating the contactors, tilt motors operably connected with the pipe tracking contactors to enable movement of the contactors between a non-functional orientation and a functional orientation, and a controller for controlling the motors based upon information provided by the tilt sensor arrays.

13 Claims, 10 Drawing Sheets

Fig. 2 (Side View)

(Bottom View)

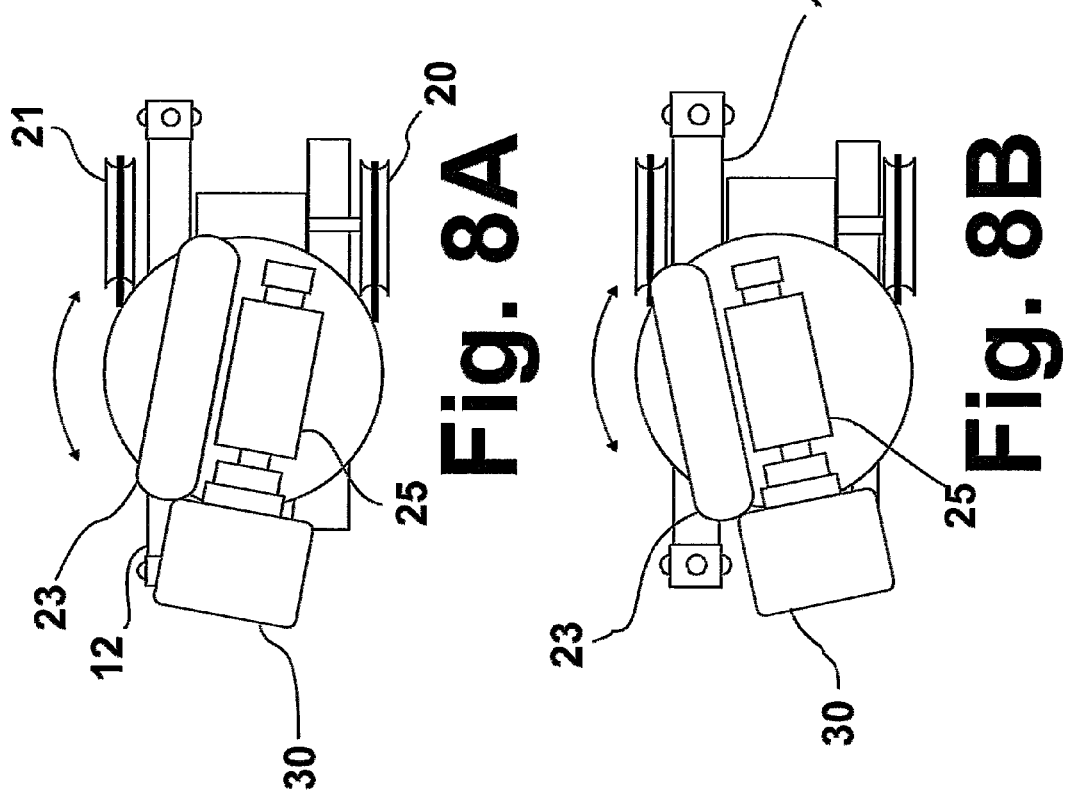

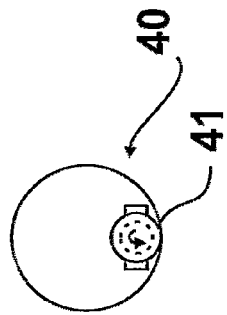
Fig. 9A
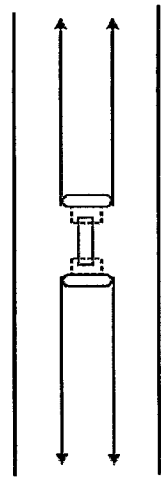
Fig. 9B
Fig. 9C
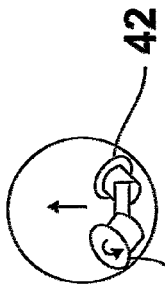
Fig. 9D
Fig. 9E
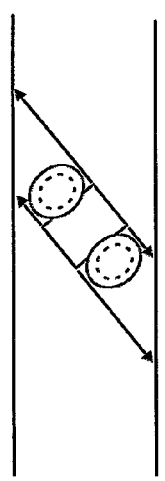
Fig. 9F
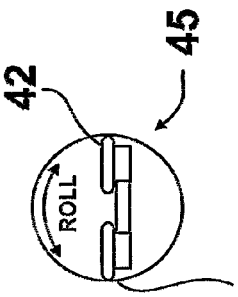
Fig. 9G
Fig. 9H (Top View)
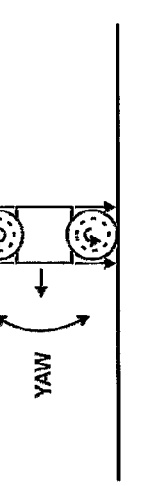
Fig. 9I (End View)

SELF-ORIENTING, TWO-WHEEL PIPE CRAWLER

BACKGROUND OF THE INVENTION

1. Field of the Invention

This invention relates to an apparatus for steering or otherwise guiding a payload through the inside of a substantially horizontal pipe. More particularly, this invention relates to an apparatus for transporting instrumentation or other equipment for internal inspection, maintenance and/or repair of an underground pipe, such as a utility pipeline, which apparatus automatically maintains a functional orientation within the pipe as it moves through the pipe. Typically, the payload is mounted to a support that is pulled or pushed or otherwise motivated along the centerline of the pipe.

2. Description of Related Art

Internal inspection, maintenance and repair of underground utility pipelines is frequently utilized to avoid expensive excavation of the ground surrounding the pipeline. In addition to being expensive, excavation offers the potential for damage to the pipeline resulting, for example, from contact with the excavation equipment.

Tools for internal pipeline inspection perform a wide variety of specific functions, such as geometric surveys, determination of metal loss, and detection of cracks or leaks. Conventional means for transporting such payloads through the inside of the pipeline have a tendency to tip or otherwise spiral within the pipeline as they travel along the pipeline. To provide the accuracy required for internal pipeline inspection, it is important to be able to maintain a fixed radial orientation while traveling through the pipe. Any imbalance in the conveyance apparatus seen by the payload can cause it to ride up the pipe wall. This, in turn, can cause the payload carriage to spiral as it moves through the pipe and, in some instances, may even cause the payload carriage to become immobilized if it flips over. Generally, this spiraling may be avoided by ensuring that the payload carriage follows the "valley" or lowest point of the pipe interior as it travels through the pipe.

Going forward, internal pipe crawlers will need to be smaller in order to navigate sharp turns and pass through narrow launch tubes. The minimum number of pipe tracking contactors, e.g. wheels or tires, that can utilize opposing pipe walls sections, instead of gravity like a car on a flat road, is two. Accordingly, future needs to locate, inspect, and repair pipelines will best be served by pipe crawlers that have at least one pair (and preferably only one pair) of contactors and can maintain their orientation while traveling along the inside of the pipe.

Pipe crawlers currently in use employ a passive orientation within a pipe, i.e., they either sit at the bottom of the pipe or they are shaped with three sets of wheels distributed in a triangle. Whether powered or not, they maintain their alignment inside the pipe because of their shapes.

To maintain traction inside a pipe, a two-wheel pipe crawler must keep both wheels or tires or other form of rollable pipe contactor, such as a ball, in contact with the pipe wall. In an upright or vertical orientation, this means staying upright and not falling forward or backward. In a horizontal orientation, this means staying centered along the major pipe diameter and not dropping to the pipe bottom after skewing.

U.S. Pat. No. 7,343,863, (the '863 patent) which is incorporated by reference herein in its entirety, teaches an apparatus for transporting a payload inside a pipeline which addresses the problem of spiraling of the apparatus within a pipe. The apparatus comprises vertically aligned upper and lower roller elements which are relationally pivotably connected with each other and which contact the inside surface of the pipe into which the apparatus is inserted. The apparatus further comprises a steering pendulum which enables the apparatus to maintain a substantially vertical orientation as it is pushed or pulled through the pipe. However, operation of the apparatus requires the use of two apparatus units connected together, a front apparatus unit and a back apparatus unit, to avoid forward or backward tipping of the apparatus.

SUMMARY OF THE INVENTION

It is, thus, one object of this invention to provide a two-wheel pipe crawler for transport of a payload inside a pipe having automated roll and yaw control.

It is another object of this invention to provide a two-wheel pipe crawler for transport of a payload inside a pipe which is self-righting from a non-functional orientation to a functional orientation.

These and other objects of this invention are addressed by an apparatus for payload transport inside a substantially horizontal pipe comprising two pipe tracking contactors connected with opposite sides of a main body and aligned to provide a functional orientation as the apparatus travels inside the pipe. The main body comprises relational pivoting means for pivotably connecting the pipe tracking contactors with the main body. The apparatus further comprises stabilization means for maintaining the apparatus in the functional orientation as the apparatus travels inside the substantially horizontal pipe. As used herein, the term "pipe tracking contactor" refers to an element which is in contact with the inside surface of the substantially horizontal pipe as the apparatus travels through the pipe. Preferably, the pipe tracking contactors are rollable elements, such as wheels, tires, or balls, to promote smooth travel of the apparatus inside the pipe.

BRIEF DESCRIPTION OF THE DRAWINGS

These and other objects and features of this invention will be better understood from the following detailed description taken in conjunction with the drawings, wherein:

FIGS. 8A and 8B are schematic diagrams showing the pivoting movement of the pipe tracking contactors of a two-wheel pipe crawler which may produce a spiraling movement within a pipe in accordance with one embodiment of this invention;

FIGS. 9A-9I are diagrams illustrating the fundamental transformational operations of the pipe tracking contactors for transitioning the apparatus of this invention from a non-functional orientation to a functional orientation in accordance with one embodiment of this invention.

DETAILED DESCRIPTION OF THE PRESENTLY PREFERRED EMBODIMENTS

Definitions

Figure 1:
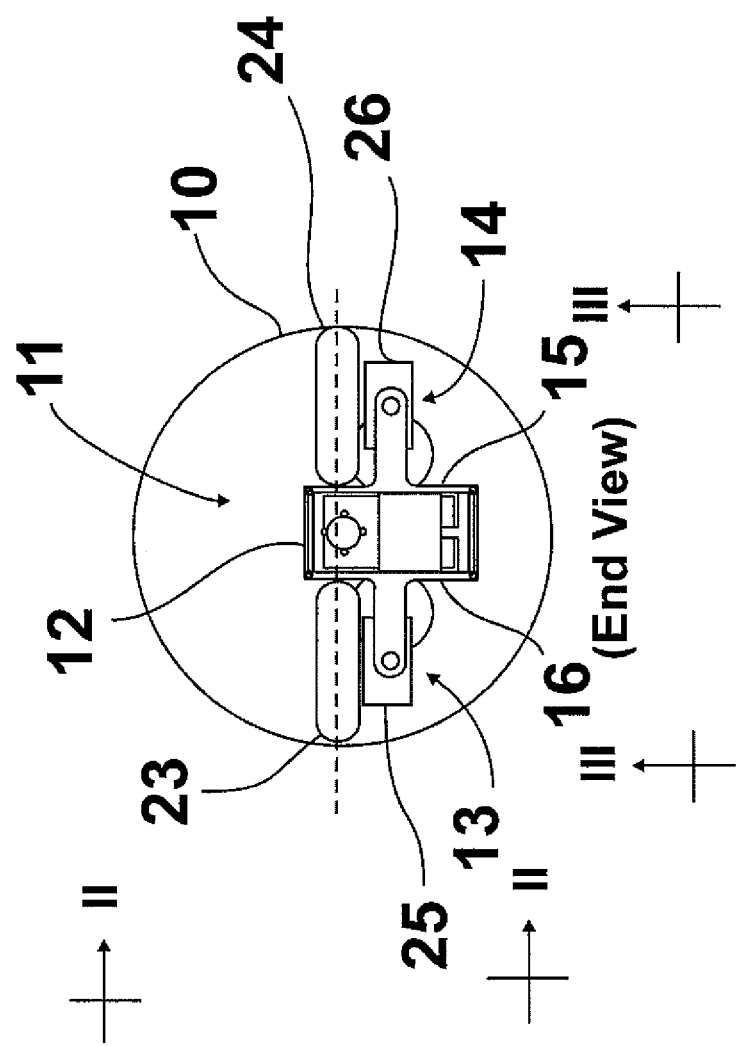
FIG. 1 is a schematic diagram showing an end view of a two-wheel pipe crawler in accordance with one embodiment of this invention in a horizontal functional orientation.
Figure 2:
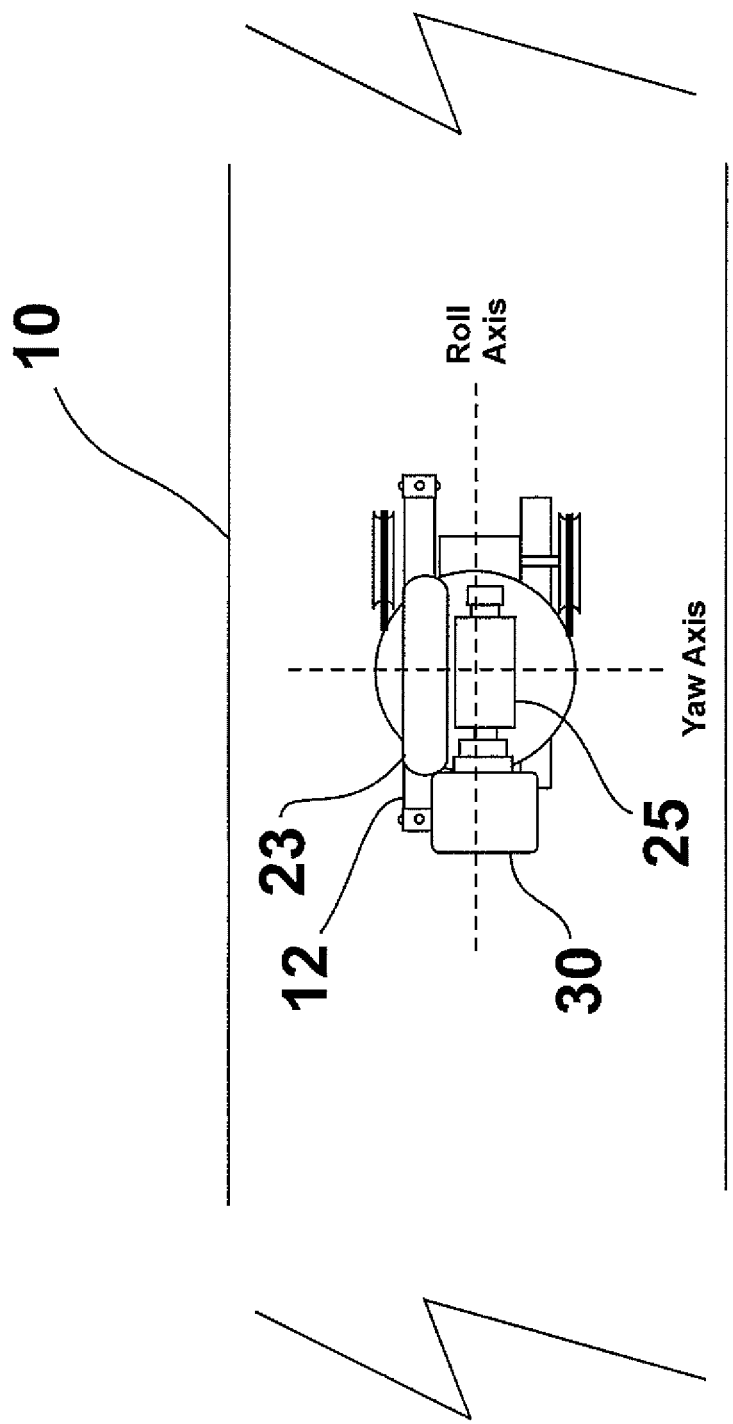
FIG. 2 is a schematic diagram showing a view of the two-wheel pipe crawler of FIG. 1 (a side view) taken along the line II-II.

It will be appreciated by those skilled in the art that maintaining the orientation of a non-uniformly shaped object in space requires control over three types of motion—pitch, roll, and yaw—all of which involve rotation around an axis of the object. For purposes of the description of this invention, the apparatus of this invention is considered to have three axes, the "longitudinal axis" of the apparatus of this invention, also referred to herein as the "pitch axis", which corresponds to a straight line extending through the apparatus perpendicular to the pipe axis as shown in FIG. 1, the "lateral axis", also referred to herein as the "yaw axis", which corresponds to a straight line perpendicular to the longitudinal axis and perpendicular to the axis of the pipe in which the apparatus is traveling and passing through a center point of the apparatus as shown in FIG. 2, and the "directional axis", also referred to as the "roll axis", which corresponds to a straight line passing through the center point of the apparatus and extending in a direction parallel to the pipe axis, also shown in FIG. 2. The term "yaw" as used in connection with the apparatus of this invention refers to a rotation of the apparatus around the lateral axis of the apparatus. The term "roll" as used in connection with the apparatus of this invention refers to rotation of the apparatus around the directional axis. The term "pitch" as used in connection with the apparatus of this invention refers to rotation of the apparatus around the longitudinal axis. Two-wheel pipe crawlers that use opposing pipe wall areas for traction must have yaw control and roll control in order to move. Because their orientation inside the pipe is active, it is necessary that the orientation of the pipe crawler be continuously monitored and corrections made as necessary to maintain the desired orientation.

As used herein, the term "functional orientation" refers to the normal traveling position of the apparatus of this invention whereby the longitudinal axis of the apparatus substantially coincides with the diameter of the pipe in which the apparatus is traveling. As used herein, the term "non-functional orientation" refers to any position of the apparatus in which the longitudinal axis is not substantially coincident with the pipe diameter of the pipe in which the apparatus is traveling. Accordingly, it will be appreciated that the functional orientation includes orientations of the apparatus in the pipe in which the deployed pipe tracking contactors are spaced apart in a horizontal direction, orientations of the apparatus in the pipe in which the deployed pipe tracking contactors are spaced apart in a vertical direction, and orientations of the apparatus between the horizontal and vertical dispositions of the spaced apart pipe tracking contactors. Thus, FIG. 1 shows an axial view of a pipe 10 in which the apparatus 11 of this invention is disposed in a horizontal functional orientation within the pipe.

The invention described herein is a self-orienting, two-wheel pipe crawler for transporting payloads along the inside of a pipe. The apparatus may be tethered for control and retrieval of the apparatus inside the pipe. However, tethering of the apparatus results in certain limitations on the mobility of the apparatus in the pipe. Alternatively, the apparatus may be untethered, providing greater freedom of mobility of the apparatus in the pipe, but also possibly making retrieval of the apparatus from the pipe more difficult in the event of an unforeseen occurrence affecting the apparatus. The apparatus requires some form of power to operate, such as a battery in the absence of a tether or direct input from an external source through a tether.

Figure 3:
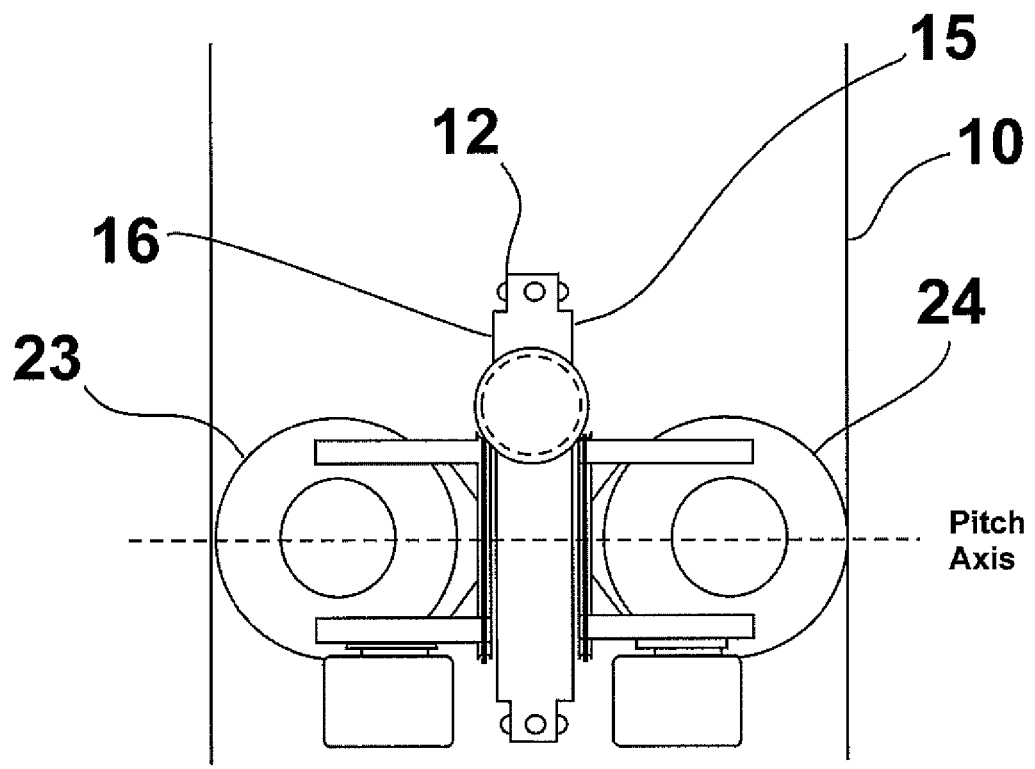
FIG. 3 is a schematic diagram showing a view of the two-wheel pipe crawler of FIG. 1 (a bottom view) taken along the line III-III.
Figure 4:
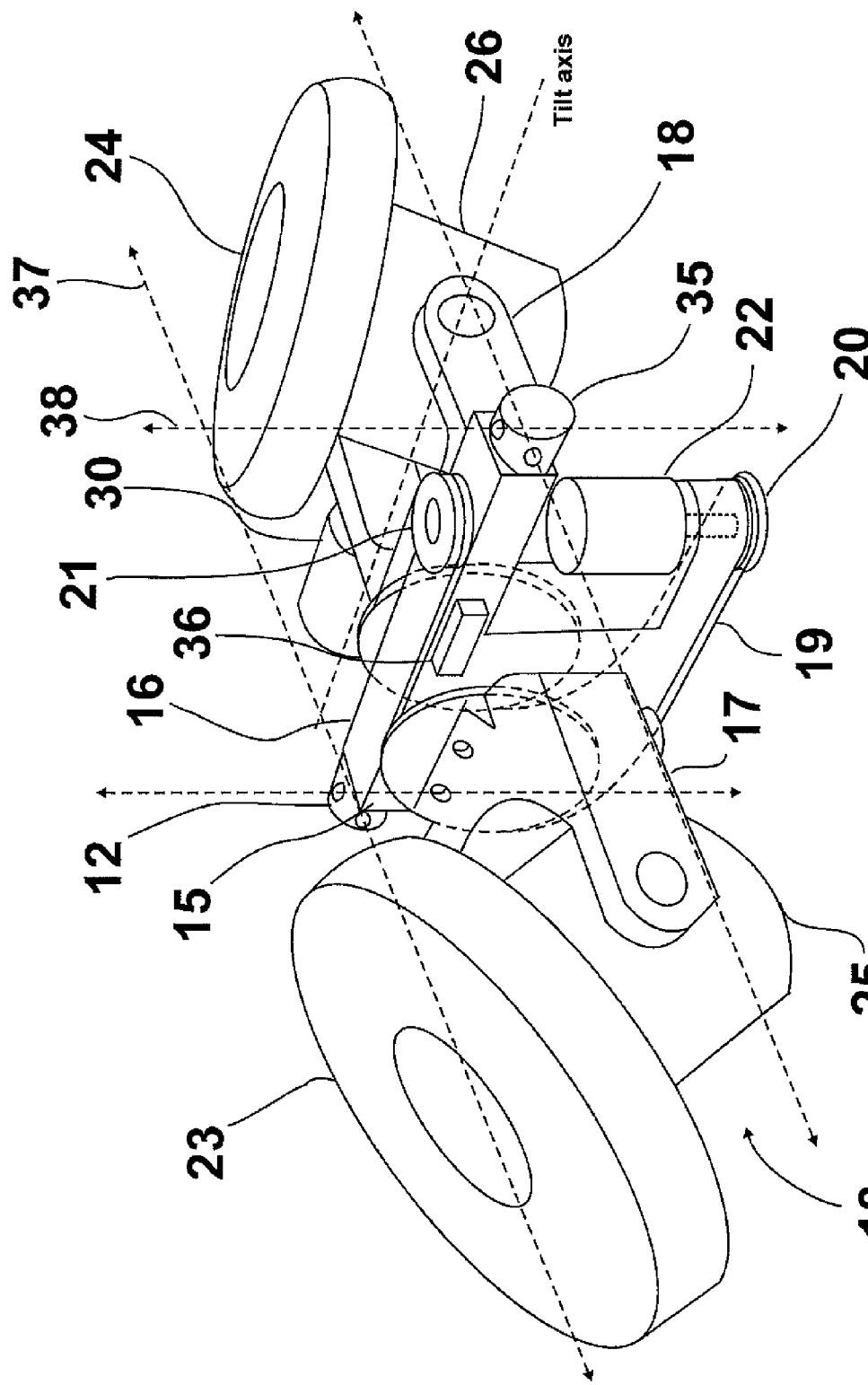
FIG. 4 is a perspective view of a two-wheel pipe crawler in accordance with one embodiment of this invention.
Figure 5:
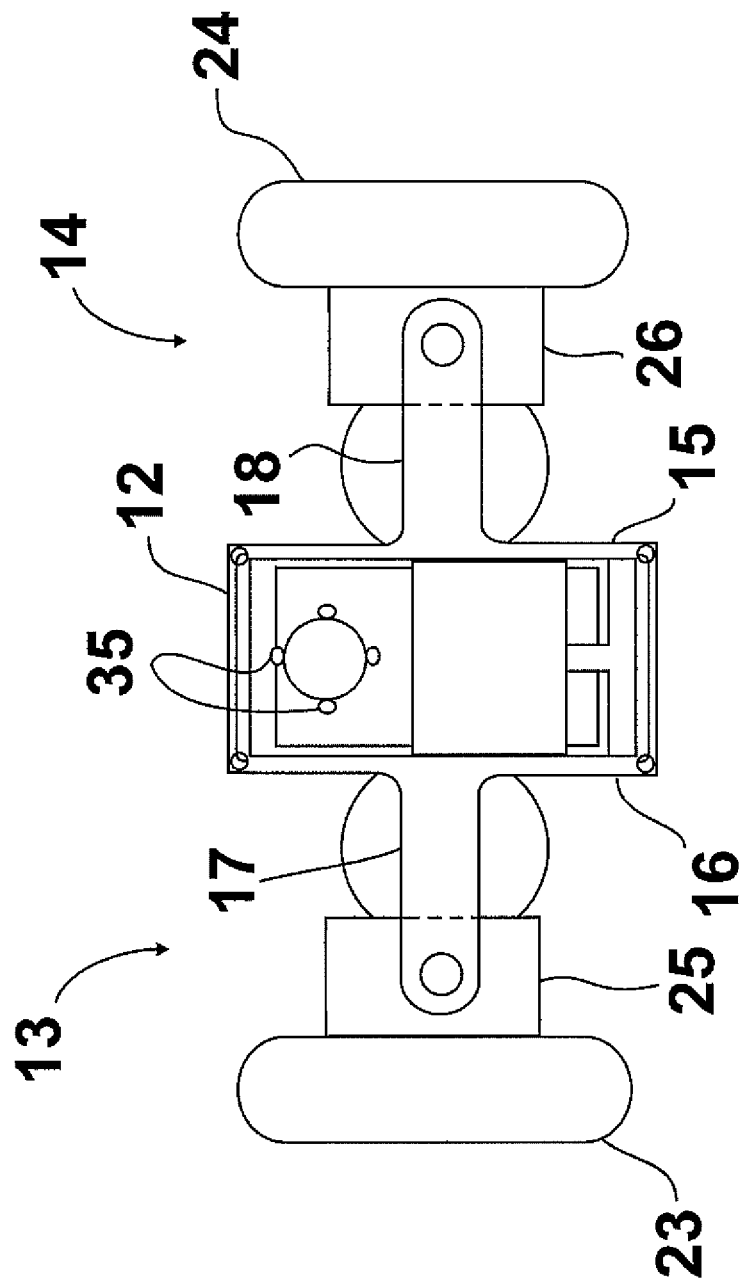
FIG. 5 is a schematic diagram of the view of the two-wheel pipe crawler of FIG. 1 with the pipe tracking contactors in a retracted (non-functional) state or position in accordance with one embodiment of this invention.
Figure 6:
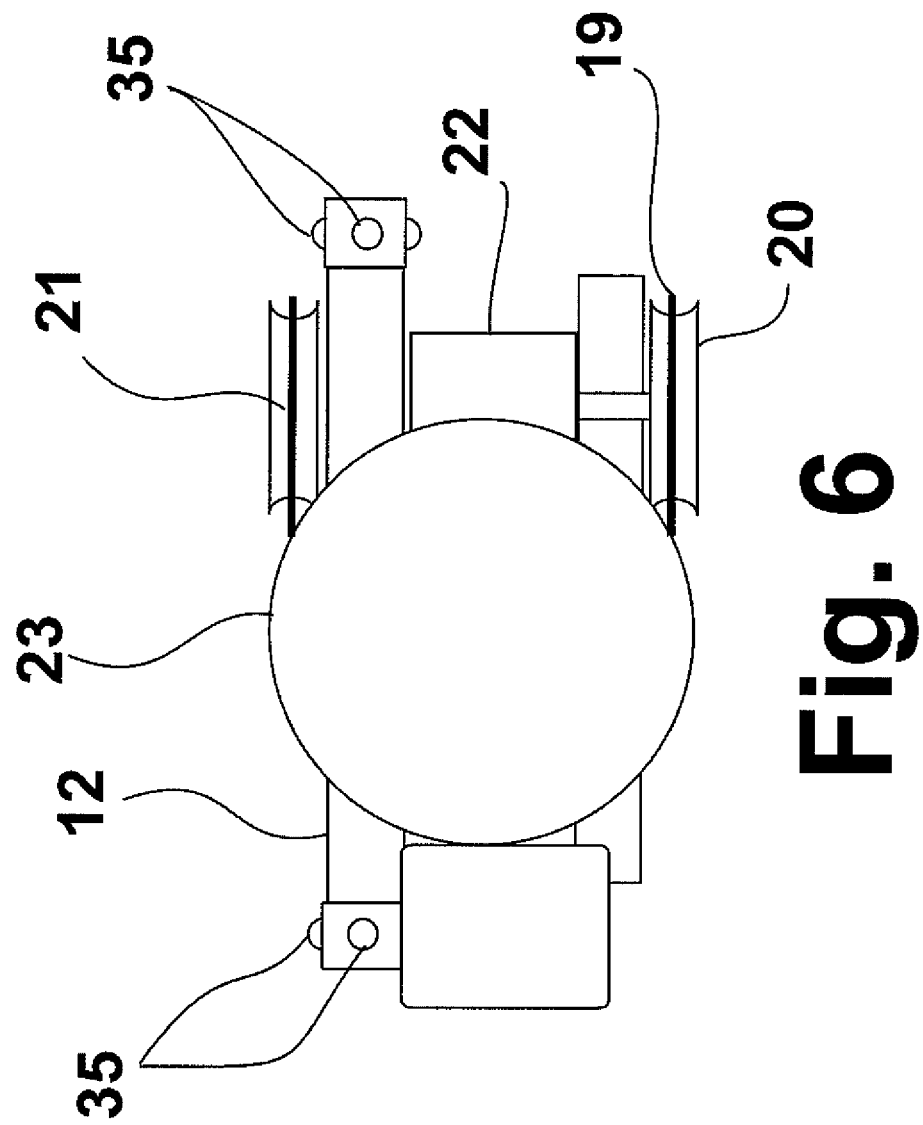
FIG. 6 is a schematic diagram of the view of the two-wheel pipe crawler of FIG. 2 with the pipe tracking contactors in a retracted (non-functional) state or position in accordance with one embodiment of this invention.
Figure 7:
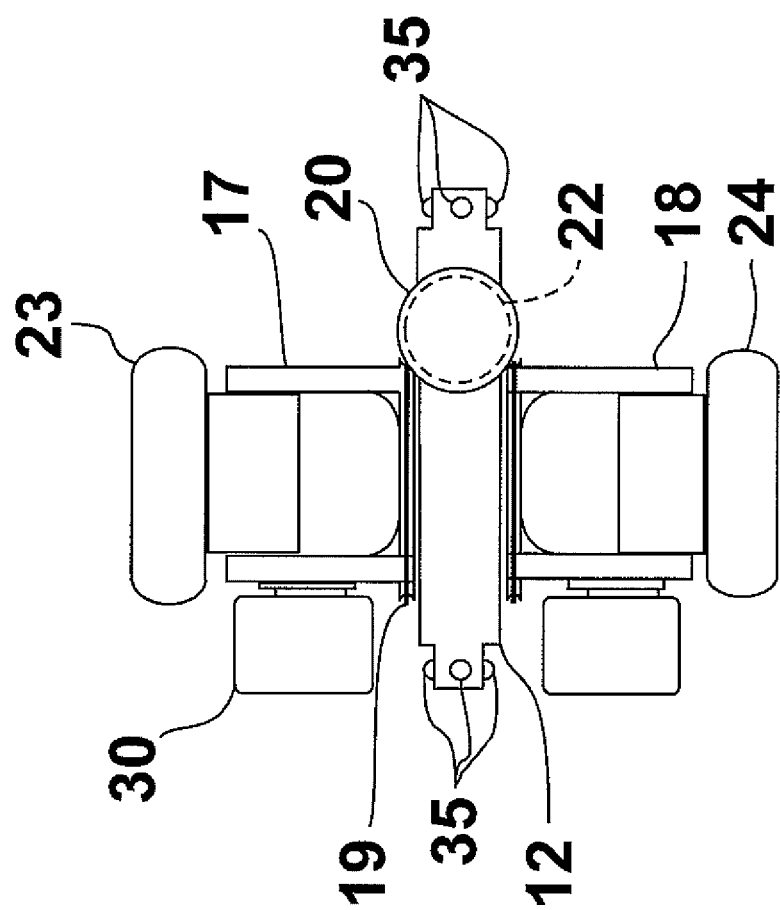
FIG. 7 is a schematic diagram of the view of the two-wheel pipe crawler of FIG. 3 with the pipe tracking contactors in a retracted (non-functional) state or position in accordance with one embodiment of this invention.

As shown in FIGS. 1-7, the pipe crawler 11 in accordance with one embodiment of this invention comprises a pipe tracking contactor assembly 13, 14 operably connected with opposite sides 15, 16 of main body 12. FIGS. 1-3 show the apparatus with the pipe tracking contactors in a deployed state or position and FIGS. 5-7 show the apparatus with the pipe tracking contactors in a retracted state. In order to control rolling of the pipe crawler in the pipe, the pipe tracking contactor assemblies are connected with the main body by relational pivot means for pivotably connecting the pipe tracking contactor assemblies in a manner such that, if one of the rollable pipe tracking contactors pivots around the longitudinal axis of the apparatus in one direction, the other rollable pipe tracking contactor pivots around the longitudinal axis of the apparatus in the opposite direction and, in so doing, returns the apparatus to a functional orientation. FIGS. 8A and 8B illustrate the pipe tracking contactors in a pivoted orientation which, if not corrected, will result in rolling or spiraling of the pipe crawler inside the pipe.

In accordance with one embodiment of this invention as shown in FIG. 4, each pipe tracking contactor assembly comprises an integrated gimble and input pulley 17, 18 operably connected by a drive belt 19 with drive pulley 20 and idler pulley 21 disposed on opposite sides of main body 12. Drive pulley 20 is operably connected by suitable means known to those skilled in the art to roll control motor 22. By virtue of this arrangement, which constitutes the relational pivot means in accordance with one embodiment of this invention, rotating of the drive pulley 20 by the roll control motor 22 causes the integrated gimble and input pulleys 17, 18 to pivot in opposite directions, resulting, in turn, in pivoting of the pipe tracking contactors in opposite directions.

In accordance with one preferred embodiment of this invention, each pipe tracking contactor assembly comprises a rollable pipe tracking contactor 23, 24 operably connected with and driven by a variable speed motor 25, 26. As will be discussed in more detail herein below, the ability to independently control the rotation speeds of the pipe tracking contactors is critical for controlling yaw of the pipe crawler.

In accordance with one embodiment of this invention, the relational pivot means comprises at least one bevel gear assembly aligned to provide relational pivoting of the pipe tracking contactors whereby pivoting of one of the pipe tracking contactors in one direction results in pivoting of the other pipe tracking contactor in the opposite direction. Such an arrangement is shown in U.S. Patent Application Publication No. 2011/0073001, which application is incorporated in its entirety into this application.

Successful transport of a payload using the apparatus of the aforementioned '863 patent requires the use of two apparatus units connected together, one in front of the other. As size can be a factor limiting the use of a given apparatus in smaller diameter pipes, it is desirable that the apparatus be as small or compact as possible. Thus, the ability to reduce the number of apparatus units required to operate the apparatus of the '863 patent to a single apparatus is highly desirable. However, as will be appreciated by those versed in the art, with only two pipe tracking contactors, it is possible that, in addition to tilting radially, i.e., rotating about the roll axis, the apparatus may also skew in a forward or backward direction, i.e., rotate around the yaw axis, where the forward direction corresponds to the direction of travel of the pipe crawler in the pipe, resulting in the apparatus falling completely forward or backward.

Forward or backward skewing of the apparatus typically occurs as a result of differences in the speed of the pipe tracking contactors. To address this issue, the apparatus of this invention is provided with stabilization means for maintaining the pipe crawler in a functional orientation. In accordance with one embodiment of this invention, the stabilization means comprises at least one tilt sensor mounted on the apparatus to sense deviations of the pipe tracking contactors from a functional orientation. In accordance with one embodiment of this invention, the tilt sensor comprises a sensor array 35 having substantially linear horizontal and vertical fields of view, wherein the substantially linear horizontal field of view extends horizontally perpendicular to the pipe axis when the pipe crawler is traveling in a functional orientation through the pipe and the substantially linear vertical field of view extends vertically perpendicular to the pipe axis when the pipe crawler is traveling in a functional orientation through the pipe. In accordance with one preferred embodiment of this invention, the sensor array monitors the relative distance of the pipe wall from the front and back of the pipe crawler. In accordance with one embodiment of this invention, the sensors of the sensor array are disposed at opposite ends of the main body of the pipe crawler and around the pipe axis in a manner providing the substantially linear horizontal 37 and vertical 38 fields of view as shown in FIG. 4. Thus, as shown in FIGS. 9G-9I, when the pipe crawler is in a functional orientation, the sensor array senses the pipe wall as two circles. However, when the pipe crawler begins to yaw, the sensor array senses the pipe wall as being elliptical (FIGS. 9D-9F), and, in the event that the pipe crawler finds itself in a non-functional orientation at the bottom of the pipe with the pitch axis substantially parallel to the pipe axis, the sensors having a substantially linear horizontal field of view do not sense the pipe wall at all (FIGS. 9A-9C). It will be appreciated by those skilled in the art that other types of tilt sensors, e.g., a level sensor which monitors the orientation of the pipe crawler based upon whether or not the sensor itself is level, may be suitable for sensing any yaw of the pipe crawler, and such sensors are to be understood to be within the scope of this invention.

The tilt sensor is operably connected with a controller 36 which may be mounted on the apparatus when the apparatus is operating in an untethered mode or which, when operating in a tethered mode, may be mounted on the apparatus or, alternatively, may be at the end of the tether distal from the apparatus, where the tether acts as a communication link for communicating between the apparatus and the controller. As previously indicated, at least one of the pipe tracking contactor assemblies comprises a variable speed contactor motor operably connected with a rollable pipe tracking contactor. The controller is operably connected with at least one of the variable speed motors by which the speeds of the contactors may be independently adjusted in response to an indication by the tilt sensor that the apparatus is beginning to yaw.

It will be appreciated by those skilled in the art that, notwithstanding the stabilizing features of the apparatus of this invention, the apparatus may fall over inside the pipe, thereby requiring that it be able to right itself. Alternatively, insertion of the apparatus through a suitable launch tube into the pipe, where the launch tube has a smaller diameter than the pipe into which the pipe crawler is inserted, may require the apparatus to self-orient to a functional orientation. In either case, FIGS. 9A-9I show a means by which the apparatus in accordance with one embodiment of this invention is able to be deployed or otherwise transformed from a non-functional position 40 at the bottom of a pipe to a functional orientation. In the embodiment shown in FIGS. 9A-9I, the pipe tracking contactors are in the form of wheels 41, 42 and the apparatus in the non-functional orientation is oriented having its longitudinal axis, or pitch axis, parallel to the pipe axis. In this position, the wheels are arranged in a retracted or folded position with the plane of rotation being perpendicular to the longitudinal axis of the pipe. Control of the transformation utilizes sensor array 35 disposed on the apparatus, which senses the disposition of the apparatus with respect to the pipe wall during the transformation process, and restoration means for restoring the apparatus to a functional orientation from a non-functional orientation. The restoration means are in operable communication with the sensor array and provide control of the wheels as shown in FIGS. 9A-9I based upon a sensor output signal providing information regarding disposition of the apparatus in the pipe based upon the distances of the sensors from the pipe wall. As previously indicated, in FIGS. 9A-9C, with the apparatus disposed at the bottom of the pipe, the sensors having a substantially linear horizontal field of view "sees infinity", i.e. no signal reflection off the pipe wall while the sensors having a substantially linear vertical field of view see the pipe wall top and bottom. As the wheels unfold and the apparatus begins to climb the pipe wall as shown in FIGS. 9D-9F, the sensor array "sees" long ellipses approaching circles. Finally, when the apparatus is in a functional orientation as shown in FIGS. 9G-9I, the sensor array sees two circles and continues to see such circles so long as the apparatus remains in a functional orientation.

Figure 10:
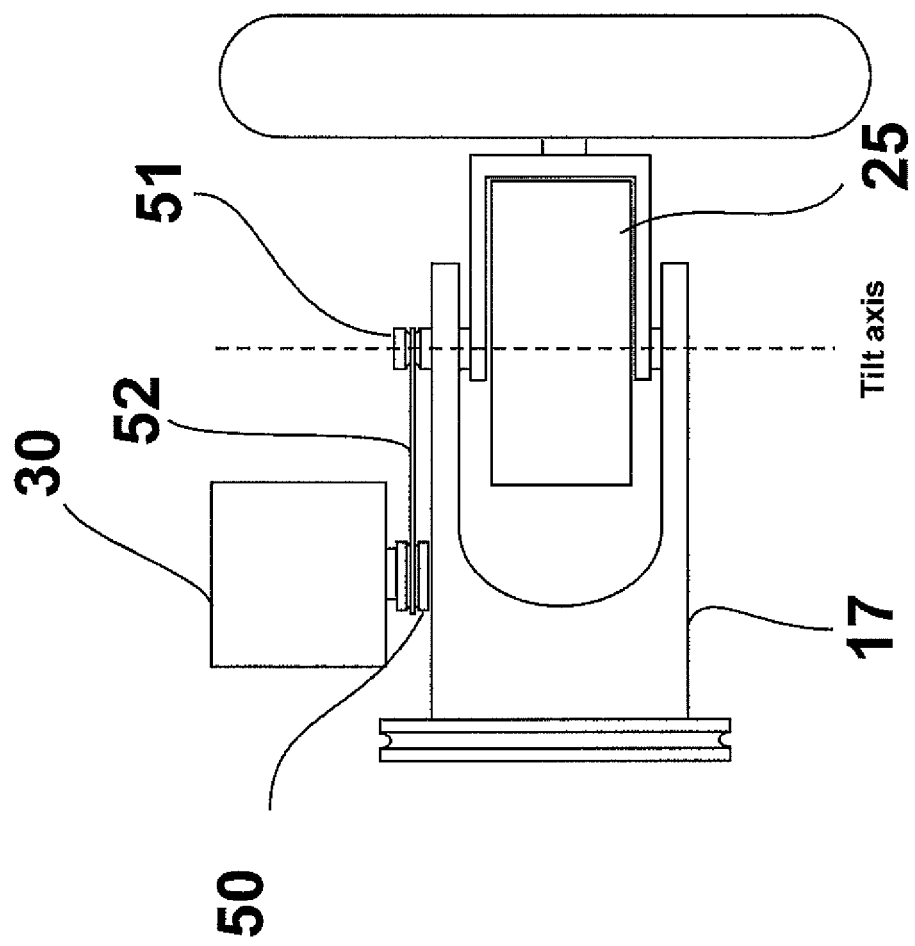
FIG. 10 is a schematic diagram illustrating components for transforming the pipe tracking contactors between a retracted state or position and a deployed state o2 position in accordance with one embodiment of this invention.

It will be appreciated by those skilled in the art that there are several possible mechanical systems by which the apparatus of this invention may be transformed from a non-functional orientation in which the pipe tracking contactors are in a retracted state to a functional orientation in which the pipe tracking contactors are in a deployed state. In accordance with one embodiment of this invention, each pipe tracking contactor assembly comprises a tilt motor 30 operably connected with each pipe tracking contactor assembly as shown, for example, in FIGS. 4 and 10, whereby each of the pipe tracking contactors are pivoted around a tilt axis from a retracted state to a deployed state. As shown in FIG. 10, tilt motor 30 is operably connected with the integrated gimble and input pulley 17 and variable speed drive motor 25 by means of two pulleys 50, 51 and a drive cable or belt 52 extending around the two pulleys. Transformation of the pipe crawler from a non-functional state at the bottom of a pipe as shown in FIG. 9 to a functional orientation involves simultaneous operation of the tilt motor attached to each pipe tracking contactor assembly and the variable sped drive motors. Thus, as the pipe tracking contactors deploy from a retracted state, the contactors will begin to contact the pipe wall, at which time the variable speed drive motors begin to drive the contactors using dispositional information provided by the tilt sensors to the controller until the contactors reached a fully deployed state and the apparatus is in a functional orientation.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An apparatus for payload transport inside a substantially horizontal pipe, the apparatus comprising:
   two pipe tracking contactors relationally pivotably connected with opposite sides of a main body and aligned to provide a functional orientation as said apparatus travels inside said substantially horizontal pipe; and
   said main body comprising relational pivot means for pivotably connecting said pipe tracking contactors with said main body; and
   stabilization means for maintaining said apparatus in said functional orientation as said apparatus travels inside said substantially horizontal pipe.

2. The apparatus of claim 1, wherein said stabilization means comprises restoration means for restoring said apparatus to said functional orientation from a non-functional orientation.

3. The apparatus of claim 2, wherein said restoration means composes a contactor tilt motor connected with each said pipe tracking contactor and adapted to move said pipe tracking contactor from a retracted position to a deployed position.

4. The apparatus of claim 3, wherein said stabilization means comprises a variable speed drive motor operably connected with one of said pipe tracking contactors to drive said pipe tracking contactor.

5. The apparatus of claim 1, wherein said stabilization means comprises at least one tilt sensor mounted on said apparatus and adapted to sense deviation of said apparatus from said functional orientation.

6. The apparatus of claim 5, wherein said at last one tilt sensor comprises a sensor array having a substantially linear horizontal field of view perpendicular to a pipe axis when said apparatus is in said functional orientation and having a substantially linear vertical field of view perpendicular to said pipe axis when said apparatus is in said functional orientation.

7. The apparatus of claim 1, wherein said stabilization means comprises a variable speed motor operably connected with each said pipe tracking contactor to drive said pipe tracking contactor.

8. The apparatus of claim 5, wherein said stabilization means comprises a controller mounted on said apparatus, said controller controlling a speed of at least one of said pipe tracking contactors based on information provided by said at least one tilt sensor to said controller.

9. The apparatus of claim 1, wherein said pipe tracking contactors are one of wheels and balls.

10. An apparatus for transporting a payload inside a substantially horizontal pipe, the apparatus comprising:
    a first rollable pipe tracking contactor relationally pivotably connected with a second reliable pipe tracking contactor, each of said first rollable pipe tracking contactor and said second rollable pipe tracking contactor positioned on a main body, said main body comprising relational pivot means for pivotably connecting each of said first rollable pipe tracking contactor and said second rollable pipe tracking contactor with said main body whereby pivoting of one of said pipe tracking contactors in one direction around a longitudinal axis of said apparatus results in pivoting of said other pipe tracking contactor in an opposite direction around said longitudinal axis of said apparatus;
    control means for maintaining a functional orientation of said apparatus in said pipe; and
    restoration means for mechanically restoring said apparatus to said functional orientation from a non-functional orientation.

11. The apparatus of Claim 10, wherein said control means comprises a variable speed drive motor operably connected with one of said pipe tracking contactors to drive said pipe tracking contactor, at least one tilt sensor arranged to detect deviation of said apparatus from said functional orientation, and a controller operably connected with said apparatus, said variable speed drive motor and said tilt sensor to control said variable speed drive motor based upon information provided by said tilt sensor to said controller.

12. The apparatus of claim 10, wherein said restoration means comprises a tilt motor connected with each said pipe tracking contactor and adapted to move said pipe tracking contactor from a retracted position to a deployed position.

13. The apparatus of claim 11, wherein said at last one tilt sensor comprises a sensor array having a substantially linear horizontal field of view perpendicular to a pipe axis when said apparatus is in said functional orientation and having a substantially linear vertical field of view perpendicular to said pipe axis when said apparatus is in said functional orientation.

* * * * *